United States Patent [19]

Oguino

[11] 4,432,010
[45] Feb. 14, 1984

[54] REAR PROJECTION APPARATUS

[75] Inventor: Masanori Oguino, Yokohama, Japan

[73] Assignee: Hitachi, Ltd., Tokyo, Japan

[21] Appl. No.: 308,590

[22] Filed: Oct. 5, 1981

[51] Int. Cl.³ ............................................. H04N 9/31
[52] U.S. Cl. ................................................... 358/60
[58] Field of Search .................. 358/60, 64, 231, 237; 350/128

[56] References Cited

U.S. PATENT DOCUMENTS 4,054,907 10/1977 Itoh ....................................... 358/60
4,219,843 8/1980 Tarahashi ............................. 358/60

FOREIGN PATENT DOCUMENTS 56-52985 5/1981 Japan ..................................... 358/60

*Primary Examiner*—Michael A. Masinick
*Attorney, Agent, or Firm*—Antonelli, Terry & Wands

[57] ABSTRACT

A rear projection apparatus for displaying a color image including red, green and blue color image sources located horizontally to each other in this order for producing respective color images of different colors. Projection lenses are located respectively in front of the image sources for projecting light flux of the respective image sources along converging optical paths, and a screen is located at convergent points of the projected light fluxes. The screen includes a light-transmitting lenticular sheet having an input surface and an exit surface wherein the input surface is constituted by horizontally diffusing lenticular profiles having a ratio of a lenticulated depth $X_v$ to a close-axis-curvature radius $R_l(X_v/R_l)$ which is within the range 0.5 to 1.8, with the profiles being prolonged along the optical axis and constituting aspherical input lenticular lenses.

13 Claims, 21 Drawing Figures

ELLIPSOID: $x^2 + \dfrac{y^2}{b^2} = 1$
$b^2 = 1 - e^2$

INPUT LENTICULAR

OUTPUT LENTICULAR

REAR SIDE
FRONT SIDE

REAR PROJECTION APPARATUS

BACKGROUND OF THE INVENTION

This invention relates to a rear projection color TV using plural cathode ray tubes placed horizontally, and is directed particularly to a high performance rear projection screen with wide audience coverage and free of color-shifts or color shading.

FIG. 1 shows a fundamental configuration of optical system used in a conventional rear projection color TV. In FIG. 1, reference numeral 1 designates a red CRT the image on which is projected by the projection lens 3 onto the screen 5. The screen 5 is composed of the Fresnel lens 6 and the lenticulars 7. The Fresnel lens 6 serves to microscopically transform the input diverging light from the projection lens into the output parallel light approximately normal to the screen. The lenticulars 7 serve to microscopically diffuse the light so as to form the image on the screen. The half-gain-angle of the diffuser determines the audience coverage.

FIG. 2 shows the desirable audience coverage. In ordinary use, ±8° for vertical direction and ±45° degree for horizontal direction are the desirable amount.

FIG. 3 shows the same relationship in a graphical representation, where curve 9 represents the horizontal directivity and curve 10 represents the vertical directivity.

In FIG. 1, a converging angle $\epsilon$ is about 6°–8° in the ordinary case. This angle $\epsilon$ is liable to cause color shifts in a reproduced picture; that is, when view from the direction A, the red color tends to be stronger than the blue color; when viewed from the direction B, the blue color tends to be stronger than the red color. This color shift or color-shading greatly deteriorates the picture quality.

Few approaches have been successful in the past in conquering this color shift.

There exists one idea which is disclosed in U.S. Pat. No. 4,054,907, where a construction shown in FIG. 4 is used for lenticulars 7 in FIG. 1. This idea assumes and is suitable for the vertically-in-line configuration of 3 tubes and 3 projection lenses although the horizontally-in-line configuration has been the more popular case in actual cases in these years and although no actual approach has been successful in conquering color shifts in the horizontal-in-line case because of the wide audience coverage required therein. In FIG. 4, numeral 11 designates a vertically diffusing cylindrical lenticular lens of which curvature radius r1 is 1 mm and the period P1 is 0.8 mm, which produces a vertical audience coverage of ±12°. Numeral 12 designates a color-shift-compensation lenticular lens of which the curvature radius and period is the same as each respective lenticular lens 11. Numeral 13 designates a horizontally-diffusing cylindrical lenticular lens of which radius curvature r3 is 0.4 mm and the period P3 is 0.6 mm, which produces a horizontal audience coverage of approximately ±27°. Numeral 14 designates a block stripe which reduces the reflectivity of the exit surface to the ambient illumination and which enhances the picture contrast.

FIG. 5 shows the ray-trace and principle of the lenticular lenses 11 and 12. In FIG. 5, a solid line designates a blue beam and a dotted line designates a red beam. As can be seen from FIG. 5, the beam landing on the center position of the input lenticular surface is transformed into the parallel output beam normal to the screen surface. Although the principle explained above pursuant to U.S. Pat. No. 4,054,907 holds very well with the specific small audience coverage and with the specific vertically-in-line configuration of 3-tubes mentioned above, it has its own limitation in the extent of the application suitable for actual cases.

In regard of practical cases, it has three disadvantages as follows.

(1) Vertically-in-line configuration of 3 tubes is difficult to build into a compact cabinet suitable for home-use because the piled height of the 3 tubes and 3 projection lenses tends to be too big as shown in FIG. 6 compared with the conventional horizontally-in-line configuration.

(2) In case of a horizontally-in-line configuration of 3 tubes, a diffusing angle of ±12° as in the case of FIG. 5 is not sufficient. More than ±35° is required for horizontal audience coverage. FIG. 7 shows what happens when the principle above is applied to the wider audience coverage. To attain horizontal audience coverage of ±40°, the period to radius ratio is required to be increased up to 1.8. In FIG. 7, reference numeral 15 designates the directivity for blue color and numeral 16 the directivity for red color. The ratio of directivity of blue to red is approximately 1.6 when observed from the side, which results in an unbalanced percentage of as much as 60%, which is worse than the desirable limit of 30%. The reason why this big unbalance is caused is attributed to the unbalance between the upper half and lower half of the input luminous flux:

$$\left(\frac{P}{2} + \Delta h\right) \text{ versus } \left(\frac{P}{2} - \Delta h\right)$$

in FIG. 7.

(3) Horizontal audience coverage is as narrow as ±27° as shown in FIG. 8 in case of the cylindrical lens configuration described above. The reason is that this narrow pass angle is inherent to the cylindrical lens configuration of lenticular 13 in FIG. 4. FIG. 8 shows the theoretical horizontal directivity calculated by the inventor pursuant to the method (equation 2) disclosed later in explanation of the invention, and it holds very well with empirical results so far obtained.

No modification in radius nor in period within the category a single cylindrical lens can achieve broader audience coverage than that shown in FIG. 8.

SUMMARY OF THE INVENTION

It is an object of this invention to provide a rear projection apparatus useful for displaying color images in which a horizontally-in-line configuration of plural color CRT's can be employed with minimized color shifts on the reproduced picture.

It is another object of this invention to provide a rear projection apparatus which can offer wide horizontal audience coverage with sufficient brightness.

To realize the object of the invention, an ellipsoidal lenticular lens is incorporated for horizontally-diffusing the input lenticular surface.

The coma aberations associated with the input ellipsoidal lenticular lens is strategically made use of to compensate for the color shifts pursuant to the procedure newly developed by this inventor as disclosed hereunder.

DESCRIPTION OF THE PREFERRED EMBODIMENTS

Figure 3:
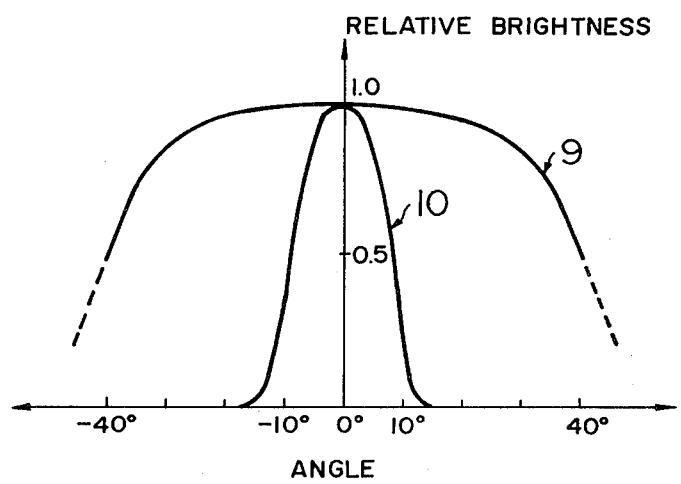
FIG. 3 is a desirable directivity curve.
Figure 4:
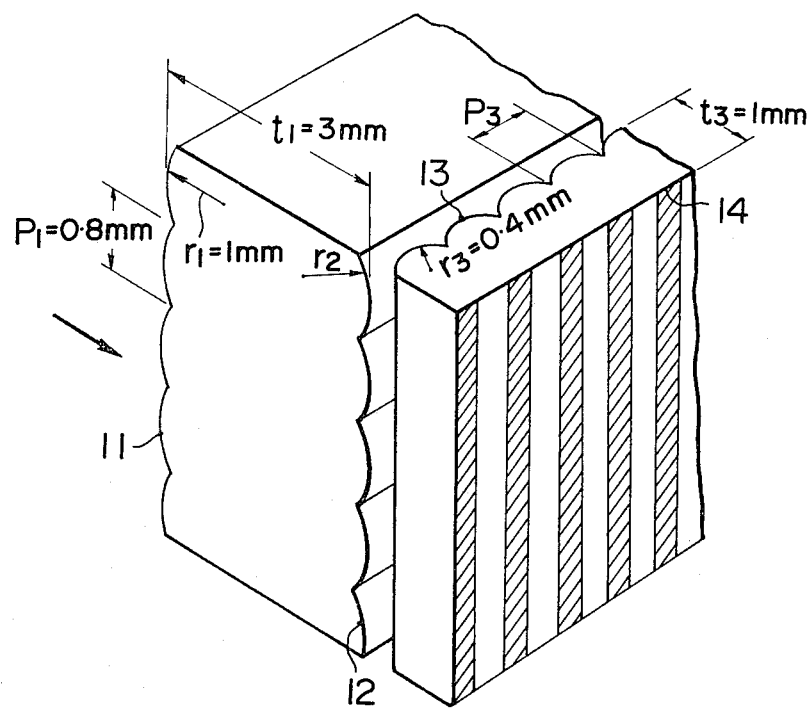
FIG. 4 is a fragmentary perspective view of a conventional lenticulars.
Figure 9:
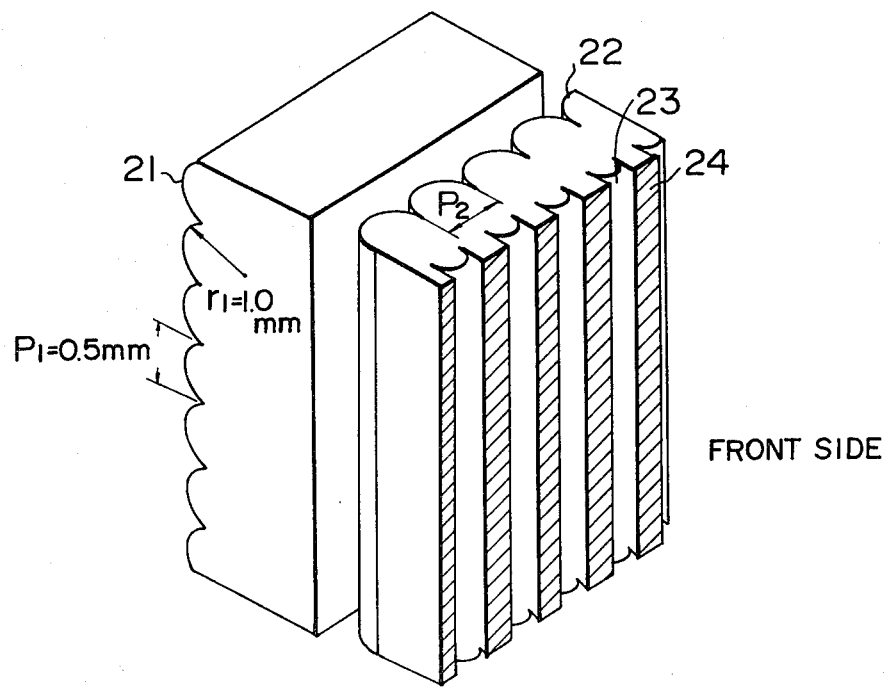
FIG. 9 is a fragmentary perspective view of a front element according to the present invention.

FIG. 9 shows the preferred embodiment of the invention for the lenticulars 7 wherein a horizontally-in-line configuration of 3 tubes is assumed. In FIG. 9, reference numeral 21 designates a vertically-diffusing diffuser surface which is composed of a cylindrical lenticular lens. This surface is not of much importance for the standpoint of this invention and it can be replaced by a randomly granular diffuser surface of which the half gain angle is approximately ±8+ as shown in FIG. 3 curve 10. Reference numerals 22, 23 designate the input/output lenticular lens respectively, which are a prime feature of this invention. Reference numeral 24 designates a black stripe which is to ehnance the picture contrast.

First of all, the shape of the input lenticular lens 22 is specified as a fraction of an ellipsoid whose eccentricity e is equal to the inverse of the refractive index n. For ordinary applications, acrylic is used for the materials of the screen of which the refractive index is approximately 1.5. (This value will be used throughout following descriptions whenever a numerical calculation is shown.)

Input lenticular surface equation:

$$\left. \begin{array}{l} x^2 + \dfrac{y^2}{b^2} = 1 \\ b^2 = 1 - e^2 \\ e = \dfrac{1}{n} = \dfrac{1}{1.5} \end{array} \right\} \quad (1)$$

Figure 10:
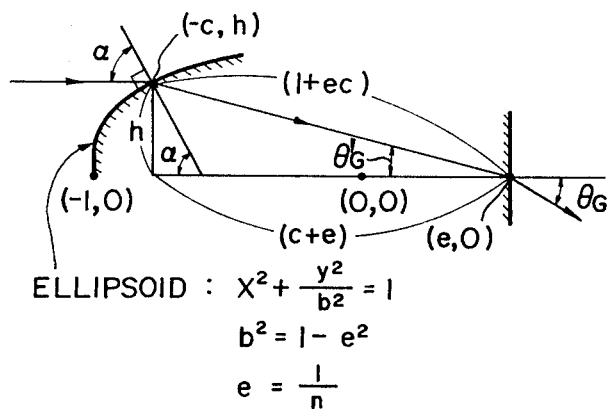
FIG. 10 is a horizontal sectional view of an ellipsoidal input lenticular lens according to the present invention.

In FIG. 10, a half fraction of the input lenticular lens is shown. An input green beam which is parallel to the longer axis of the ellipsoid is refracted by the lens surface and arrives at the focal point without wave front aberrations because the optical distance d from the plane ($x = -1$) to the focal point ($x = e$) is a constant regardless of arrival coordinate ($-c$, $h$) on the lenticular surface as follows.

$$d = 1 - c + (1 + ec)n$$
$$= 1 - c + n + c = 1 + n: \text{constant.}$$
(1)

Note: Numeral of an old equation attached under a new equation code means that the old equation is used to drive the new equation.

Now, relative brightness B versus horizontal observation angle $\theta_G$ characteristics shall be calculated.

Pursuant to the definition of brightness, $$B = \frac{dh}{\cos \theta_G \, d\theta_G} = \frac{dh}{d(\sin \theta_G)} \quad (2)$$

In equation 2, $\cos \theta_G$ is the Lambertian coefficient and dh represents the differential of input luminous flux. From FIG. 10, $$\sin \theta'_G = \frac{h}{1 + ec}$$

$$\sin \theta_G = n \sin \theta'_G$$

$$\left. \begin{array}{l} \therefore \sin \theta_G = \dfrac{nh}{1 + ec} \\ C = \sqrt{1 - \left(\dfrac{h}{b}\right)^2} \end{array} \right\} \quad (3)$$

$$\therefore B = \frac{(1 + ec)^2}{n\left(1 + ec + \dfrac{1}{c} - c\right)} \quad (4)$$

Figure 8:
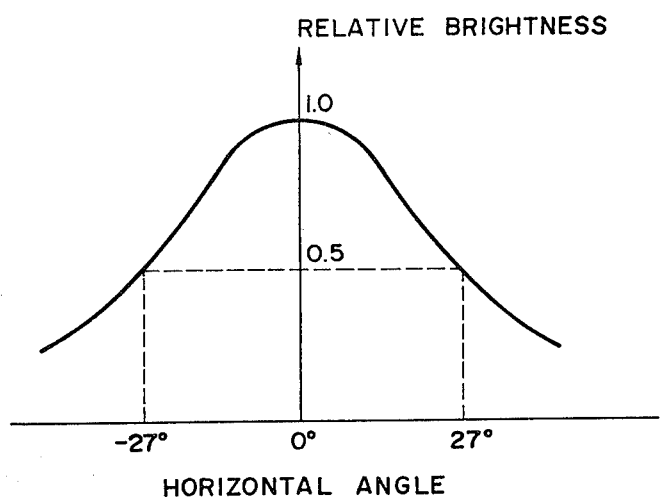
FIG. 8 is a horizontal directivity curve of the prior art.
Figure 11:
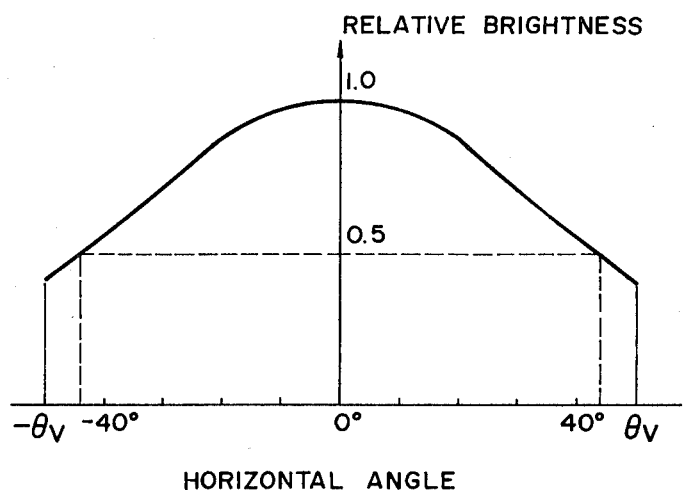
FIG. 11 is a horizontal directivity curve according to the present invention.

This is calculated and plotted in FIG. 11, which shows much improved audience coverage compared with that of the prior art in FIG. 8. (27°→43°)

Next, the newly developed principle to improve color shifts will be described.

Figure 12:
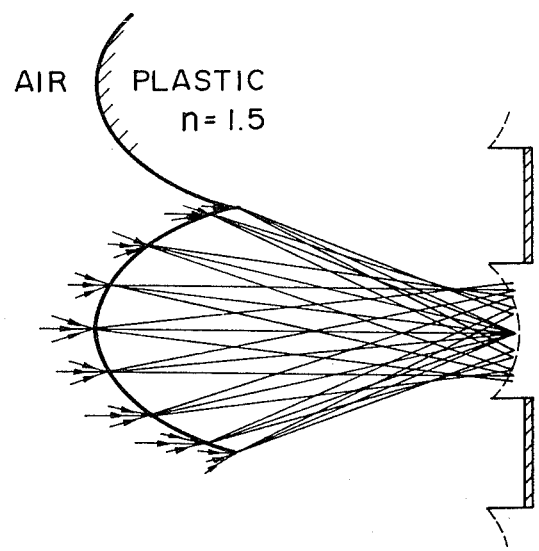
FIG. 12 is an enlarged fragmentary horizontal sectional view of a front element according to the present invention.

FIG. 12 shows the ray-trace results of red, green, blue beams in the case of the ellipsoidal lenticular surface of this invention.

Coma aberration is clearly observed in red/blue ray-traces.

The primary feature of this invention is to make use of the coma aberration presented in FIG. 12 to determine the shape of the output lenticular lens.

Now, disclosure will be made with the aid of coordinates shown in FIG. 13.

$\epsilon$: Converging angle of input blue ray.

$(-c, h)$: Arrival coordinate of input ray element.

$(x_v, y_v)$: Valley coordinate. $y_v$ is the half period of the lenticular, which determines audience coverage limit.

$h'$: Intrinsic arrival height of input blue ray element.

$\Delta h$: $h' - h$ $\theta_B$: Exit angle of blue ray element in case the output lenticular surface was a plane.

$\theta_B$ is a function of $\epsilon$ and $h$, although it is difficult to express explicitly. Let it be set as $f(\epsilon, h)$.

$$\theta_B = f(\epsilon, h) \tag{5}$$

Then, following equations are valid.

$$\theta_R = f(-\epsilon, h) \tag{6}$$

$$\theta_G = f(o, h) = \sin^{-1} \frac{nh}{1 + \epsilon \sqrt{1 - \left(\frac{h}{b}\right)^2}} \tag{7}$$

Required compensation angle $\delta$ for blue color in reference to green color can be expressed as follows:

$$\delta = -f(\epsilon, h) + f(o, h + \Delta h) \tag{8}$$

$$\approx -\frac{\partial f}{\partial \epsilon} + \frac{\partial f}{\partial h} \Delta h \, \epsilon$$

$$\approx -\frac{df(o, h)}{d\epsilon} \epsilon + \frac{\partial f(o, h)}{\partial h} \times \Delta h \tag{9}$$

$$= \delta_1 + \delta_2, \; \delta_1 = \frac{-df}{d\epsilon} \epsilon, \; \delta_2 = \frac{\partial f}{\partial h} \Delta h \tag{9'}$$

In the prior art, only the first term in equation (9) has been taken into account and no consideration has been made on the second term to compensate for $\Delta h$ in FIG. 11 because an application has not been attempted for such a wide audience coverage as this invention contemplates.

Confirmation will be made in later part of this description how meaningfully the second term in equation (9) takes part for compensation purpose. Equation (9) can be transformed as follows:

(Policy: To express $\delta$ by $c$, $\epsilon$)

$$\frac{\partial f}{\partial \epsilon} = \frac{df}{d\epsilon} = \frac{d\theta_G}{d\epsilon} = \frac{d\theta_G}{d\theta'_G} \frac{d\theta'_G}{d\epsilon} \tag{10}$$

$$\frac{d\theta_G}{d\theta'_G} = \frac{n \cos \theta'_G}{\cos \theta_G} \quad (\because n \sin \theta'_G = \sin \theta_G)$$

$$\left. \begin{array}{l} \cos \theta'_G = \frac{1}{\sqrt{1 + \tan^2 \theta'_G}} \\[6pt] \cos \theta_G = \sqrt{1 - n^2 \frac{\tan^2 \theta'_G}{1 + \tan^2 \theta'_G}} \\[6pt] \tan \theta'_G = \frac{h}{c + e} \overset{(1)}{=} \frac{b\sqrt{1 - c^2}}{c + e} \end{array} \right\} \tag{10'}$$

$$\therefore \frac{d\theta_G}{d\theta'_G} = \frac{n}{\sqrt{1 - \frac{(n^2 - 1)b^2(1 - c^2)}{(c + e)^2}}} \tag{11}$$

$$\frac{d\theta'_G}{d\epsilon} = \frac{\cos \alpha}{n \cos(\alpha - \theta'_G)} \quad (\because \sin \alpha = n \sin(\alpha - \theta'_G))$$

$$= \frac{e}{\cos \theta'_G + \tan \alpha \sin \theta'_G}$$

$$= \frac{e}{\frac{c + e}{1 + ec} + (\tan \alpha) \frac{h}{1 + ec}}$$

$$= \frac{e(1 + ec)}{c + e + h \tan \alpha}$$

$$\tan \alpha = \frac{h}{c} \cdot \frac{1}{b^2}, \; h = b\sqrt{1 - c^2}$$

$$\therefore \frac{d\theta'_G}{d\epsilon} = \frac{e(1 + ec)}{c + e + \frac{b^2(1 - c^2)}{b^2 c}} = ec \tag{12}$$

From Equation (10), (11), (12), $$\frac{df}{d\epsilon} = \frac{c}{\sqrt{1 - \frac{(n^2 - 1)b^2(1 - c^2)}{(c + e)^2}}} \tag{13}$$

Going ahead to $(\partial f / \partial h) \Delta h$ in eq. (9), $$\Delta h = (c + x_v) \epsilon$$

$$\frac{\partial f}{\partial h} = \frac{\partial \theta_G}{\partial h} = \frac{\partial \theta_G}{\partial \sin \theta_G} \cdot \frac{\partial \sin \theta_G}{\partial h}$$

$$\overset{(3), (4)}{=} \frac{n}{\sqrt{1 + \frac{n^2 b^2 (1 - c^2)}{(1 + ec)^2}}} \cdot \frac{1 + ec + \frac{1}{c} - c}{(1 + ec)^2} \tag{14}$$

$$\therefore \frac{\partial f}{\partial h} \Delta h = \frac{n(c + x_v)\epsilon}{\sqrt{1 + \frac{n^2 b^2 (1 - c^2)}{(1 + ec)^2}}} \cdot \frac{1 + ec + \frac{1}{c} - c}{(1 + ec)^2}$$

Now that $\delta$ can be expressed by eq. (9), (13), (14), next step is to get arrival height $y$ at output lenticular surface.

Figure 13:
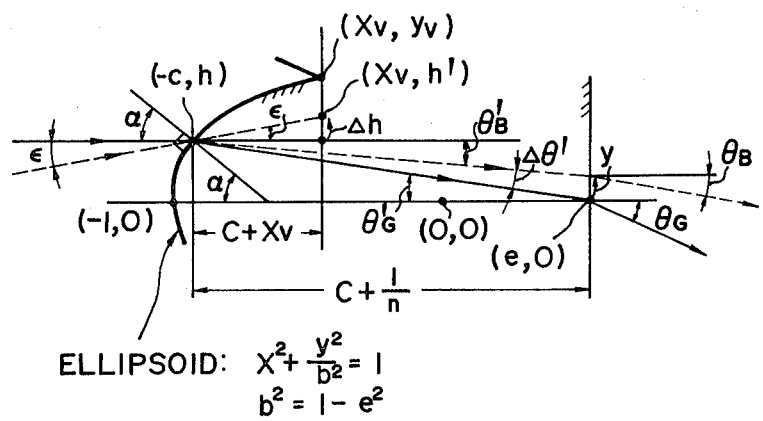
FIG. 13 is a horizontal sectional view showing coordinates for the apparatus of the present invention.

From FIG. 13, $$y = (c + e) \Delta \tan \theta'_G \tag{15}$$

$$= (c + e)(1 + \tan^2 \theta'_G) \frac{d\theta'_G}{d\epsilon} \epsilon$$

$$= ce(c + e) \left\{ 1 + \frac{b^2(1 - c^2)}{(c + e)^2} \right\} \epsilon$$

Equation (15) shows that arrival height $y$ is solely decided by $c$ (and $\epsilon$), and is not affected by $h'$; which means coma aberration is the only aberration present.

Noting same property in equations (13), (14), (9), the relation between required compensation angle $\delta$ versus arrival height $y$ can be determined by an auxiliary variable c which is the arrival depth at the input lenticular lens.

δ determines the required gradient dx/dy of the exit surface pursuant to Snell's law:

$$n \sin\left(\theta'_G - \frac{dx}{dy}\right) \approx \sin\left(\theta_G - \frac{dx}{dy} + \delta\right) \quad (16)$$

$$\therefore -n \frac{dx}{dy} \cos\theta'_G \approx \left(\delta - \frac{dx}{dy}\right) \cos\theta_G$$

$$\therefore \frac{-dx}{dy} \approx \frac{\delta}{n \frac{\cos\theta'_G}{\cos\theta_G} - 1}$$

$$\approx \delta \left( \frac{n}{\sqrt{1 - \frac{(n^2 - 1)b^2(1 - c^2)}{(c + e)^2}}} - 1 \right)^{-1} \quad (10')$$

From equations (9), (13), (14)

$$\delta = C \left\{ 1 - \frac{(n^2 - 1)b^2(1 - c^2)}{(c + e)^2} \right\}^{-\frac{1}{2}} \cdot \epsilon + \frac{n(c + x_v)}{\sqrt{1 + \frac{n^2 b^2 (1 - c^2)}{(1 + ec)^2}}} \cdot \frac{1 + ec + \frac{1}{c} - c}{(1 + ec)^2} \cdot \epsilon \quad (17)$$

(for blue, ε>0, for red ε<0)

In case given a fixed tilt angle ε and arrival depth c at input lenticular, arrival height at the exit plane can be obtained by eq. (15). The required compensation angle δ at the exit plane can be obtained by equation (17), through which the required gradient dx/dy of the exit surface can be determined by equation (16).

Hence, the relation dx/dy versus y is obtained, which forms a differential equation. Solving the equation in any way such as piece-wise linear approximation, Fourier expansion, polynomial expansion or graphical solution, the x versus y relation can be obtained, that is the required profile for the output lenticular lens.

To show the validity of the method mentioned above, numerically calculated examples are shown although this invention is not meant to be limited to the examples.

Note: $\delta_1$ and $\delta_2$ below represents the 1st term and 2nd term in equation (17) respectively.

EXAMPLE A

Valley coordinate be set at $(x_v, y_v) = (-0.593, 0.600)$, which corresponds to the audience coverage of approximately ±40°.

Calculated results:

| C = | 1.0 | 0.9 | 0.8 | 0.7 | 0.6 |
|---|---|---|---|---|---|
| y/ε = | 1.111 | 0.980 | 0.855 | 0.735 | 0.619 |
| δ₁/ε = | 0.366 | 0.341 | 0.292 | 0.196 | 0.017 |
| δ₂/ε = | 1.00 | 0.925 | 0.851 | 0.778 | 0.706 |
| δ/ε = | 1.366 | 1.27 | 1.14 | 0.974 | 0.723 |
| $\frac{-dx}{dy}$ /ε = | 2.73 | 2.35 | 1.92 | 1.46 | 0.947 |

Replacing the converging angle ε by the practical value 0.128 radian and using polynomial expansion technique, following solution can be obtained as a profile of the output lenticular lens for the region of $|y/\epsilon| = 1.111 \sim 0.619$ $$-x = -\frac{1}{n} + \frac{0.558}{2} y^2 + \frac{22.6}{4} y^4 + \frac{38700}{6} y^6 - \frac{3290000}{8} y^8 + \frac{77400000}{10} y^{10} \quad (18)$$

Figure 14:
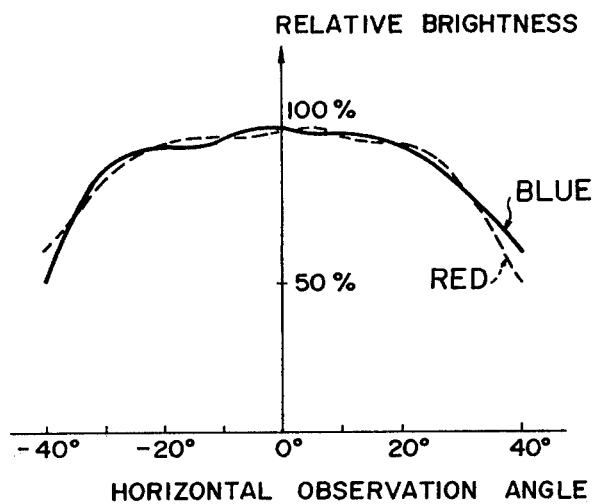
FIG. 14 is a color-shift curve according to the present invention.

FIG. 14 shows the directivity characteristics of red and blue as a result of computer calculation corresponding to equation (18). As can be seen from FIG. 14, the ratio between red and blue is within 1.2, in other words, the color shift difference is within 20% which is much better than the case of the prior art where it was approximately 60%.

It should be noted that since equation (18) is significant within the region of $|y/\epsilon| = 1.111 \sim 0.619$, the profile corresponding to the outside of the region can be deformed in any way to simplify the fabrication.

To make easier the fabrication of a die for production of the screen, it may be desirable if the output surface profile can be a simple parabola such as equation (19) where k is a constant.

$$-x = -\frac{1}{n} + \frac{k}{2} y^2 \quad (19)$$

In this case, significant importance should be placed upon the observation area normal to the screen: the area which corresponds to c=1 in eq. (15) through (17).

Replacing arrival depth c by unity, following equations are obtained.

$$\frac{y}{\epsilon} = e(1 + e) \quad (20)$$

y: arrival height at the exit surface.

$$\frac{-dx}{dy} = \frac{\delta}{n - 1} \quad (21)$$

$$\frac{\delta}{\epsilon} = \frac{\delta_1 + \delta_2}{\epsilon} = 1 + \frac{n(1 + x_v)}{1 + e} \quad (22)$$

$$\frac{\delta_1}{\epsilon} = 1, \frac{\delta_2}{\epsilon} = \frac{n(1 + x_v)}{1 + e} \quad (23)$$

$$e = \frac{1}{n}$$

The curvature k in equation (19) can be obtained as follows:

$$k = \frac{\frac{-dx}{dy}}{y}$$

Hence, $$k = \frac{1 + \frac{n(1 + x_v)}{1 + e}}{(n - 1)e(1 + e)} = \frac{e(1 + e) + 1 + x_v}{(1 - e)(1 + e)^2 e} \quad (24)$$

$$= \frac{1}{(1 - e)(1 + e)} + \frac{1 + x_v}{(1 - e)(1 + e)^2 e}$$

Since $e = \frac{1}{n} = 0.667$,

-continued
$$k = 1.8 + 1.62(1 + x_v) \quad (25)$$

$$k_1 = 1.8, \ k_2 = 1.62(1 + x_v) \quad (26)$$

In equation (25), $x_v$ is the valley coordinate shown in FIG. 13 which determines the limit angle $\theta_v$ of horizontal audience coverage as shown in FIG. 11. The relation between $x_v$ and $\theta_v$ can be found through equation (7), taking into account following relation between $h(y_v)$ and $x_v$.

$$x_v^2 + \frac{y_v^2}{b^2} = 1 \quad (1')$$

$$h = y_v$$

Calculated results are set forth as follows:

TABLE 1

Relation among $x_v$, $y_v$, $\theta_v$, $k$, $k_2/k_1$

| $x_v$ | −0.2 | −0.3 | −0.4 | −0.5 | −0.6 | −0.7 | −0.95 |
|---|---|---|---|---|---|---|---|
| $y_v$ | 0.73 | 0.71 | 0.68 | 0.65 | 0.60 | 0.53 | 0.23 |
| $\theta_v$ | 81° | 62° | 53° | 48° | 40° | 33° | 12° |
| $k$ | 3.10 | 2.93 | 2.77 | 2.61 | 2.45 | 2.29 | 1.88 |
| $k/k_1$ | 1.72 | 1.63 | 1.54 | 1.45 | 1.36 | 1.27 | 1.04 |

In Table 1, $k_1$ and $k_2$ are pursuant to equation (26); $k_1$ is related to $\delta_1$ in equation (22), (9'); $k_2$ is related to $\delta_2$ in equation (22), (9').

As previously mentioned in reference to equation (9), $\delta_2$ hence $k_2$ is one of the unique and distingished factors in this invention which discriminates this invention from the prior art.

To show the significance of this factor, the ratio $k/k_1$ is shown in Table 1.

Figure 7:
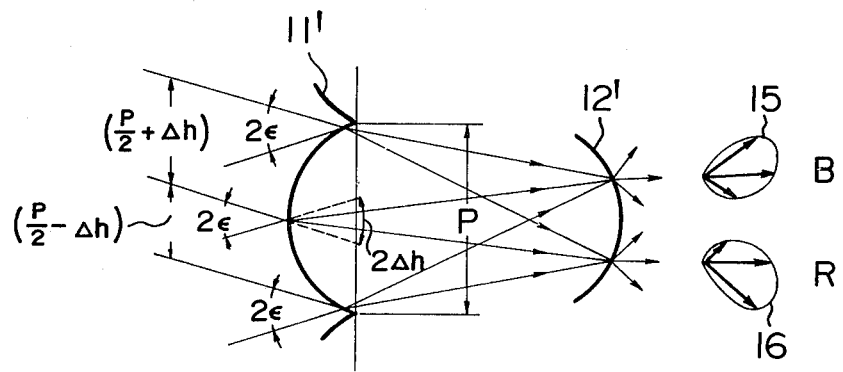
FIG. 7 is a sectional view belonging to the prior art.

$k_1$ is the curvature which has been proposed in prior art which stemmed from the thought to locate the focal point of the output lenticular lens on the input lenticular surface. However, the thought did not take into account the necessary compensation required which corresponds to the deviation associated with $\Delta h$ in FIG. 7 and FIG. 13.

In other words, pursuant to the prior art, converging input optical paths of the three beams stemmed from the 3 projection lenses having been transformed by lenticular surfaces into parallel output beams in relation to each color.

However, in this invention, only those input beams which arrive close to the valley points between each input lenticular elements are transformed into parallel output beams in relation to each color. Those beams which arrive at the center portions of each input lenticular element are not transformed into parallel output beams in relation to each color, but rather are transformed into non-parallel beams intentionally shifted by the angle determined by $\delta_2$ in equation (23), which is the heart of this invention to improve color shifts in wide audience coverage applications. It may appear difficult and contradictory to transform input beams differently depending upon the arrival point at input lenticular surface, however, as has been shown in detail in the disclosure of this invention, coma aberration of input lenticular lens as sketched in FIG. 12 is successfully utilized to make it possible.

It should be noted that although in such applications where only ±12° were sufficient for audience coverage as in the case of the prior art, the output lenticular profile could be in the form of a trapezoid; however, in this invention where more than ±35° is required for audience coverage, it is impossible to use a trapezoidal lenticular profile.

To demonstrate that a simple profile pursuant to equation (19) can also offer a good performance, Example B will be disclosed which approximately corresponds to the second column of Table 1.

EXAMPLE B $x_v = -0.4$, $y_v = 0.68$, $\theta_v = 53°$ $k \approx 2.7$
Profile of output lenticular surface:

$$-x = -\frac{1}{n} + 1.35 y^2 \quad (27)$$

Figure 5:
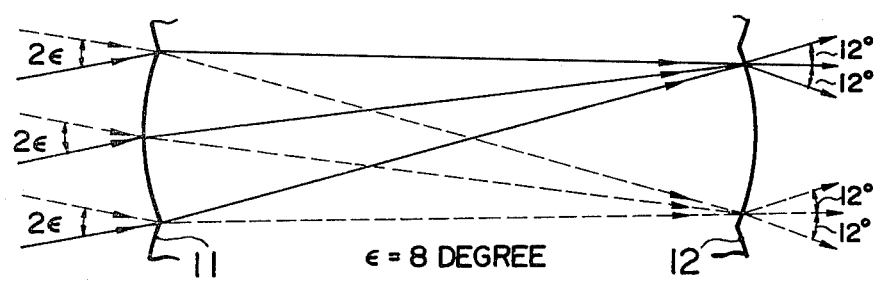
FIG. 5 is an enlarged fragmentary vertical sectional view of the portion of a prior art arrangement shown in FIG. 4
Figure 6:
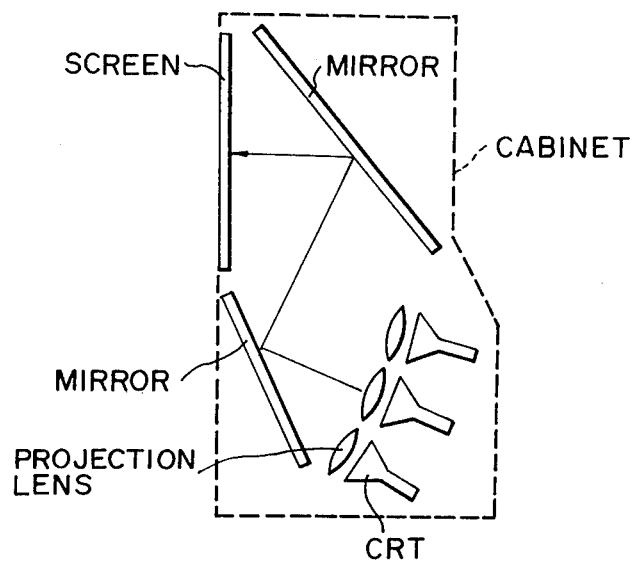
FIG. 6 is a schematic sectional view of a cabinet construction corresponding to the prior art arrangement.
Figure 15:
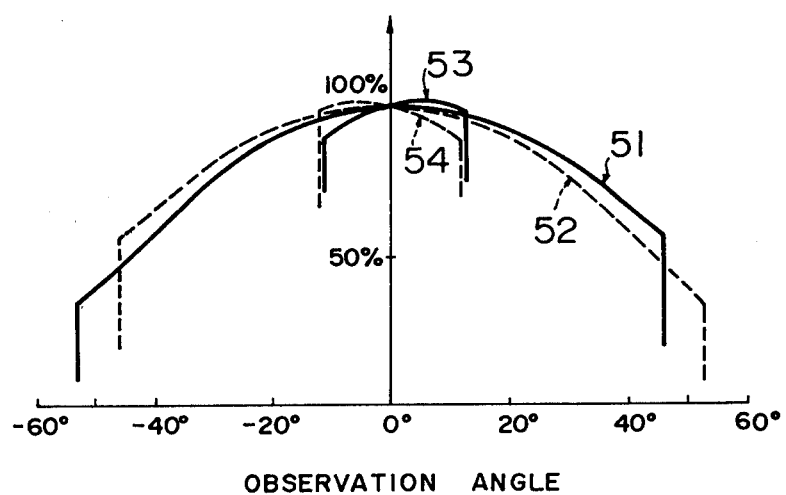
FIG. 15 is a color-shift curve comparing the the present invention with the prior art.

FIG. 15 shows the directivity characteristics. In FIG. 15, the reference numerals designate the following:
solid line 51: Blue color in Example B
dotted line 52: Red color in Example B
solid line 53: Blue color in prior art FIG. 5
dotted line 54: Red color in prior art FIG. 5

As can be clearly understood from FIG. 15, the present invention not only enhances the audience coverage but also remarkably improves color shifts even within the range of ±12°, thus offering excellent picture quality.

The difference between the limit angle of blue audience coverage and that of red audience coverage arises from the process in which a simple parabolic profile has been selected as in Eq. (27).

Although this difference may seem to deteriorate color shifts when viewed from ±50° or −50° direction, it can be somewhat softened and improved through the spreading effect of the random diffuser version which has been described in the preceding section as an alternative to be used in place of the vertical lenticular lens 21 in FIG. 9.

In describing preferred embodiments of this invention, equation (1) has been employed for the profile of the input lenticular lens where the eccentricity of the ellipsoid has been set at $1/n$. However, the scope of this invention is not meant to be limited to the specific ellipsoidal lenticular surface. In fact, are arbitrary prolonged-along-x-axis super parabola expressed by Eq. (28) can be adopted where $A_4$, $A_6$, ... are constants.

$$x = -1 + \frac{1.8}{2} y^2 + A_4 y^4 + A_6 y^6 + \ldots \equiv L(x) \quad (28)$$

In this case, Eq. (3), (4) are not valid, but Eq. (5), (6) and the front half of Eq. (7) are valid. The rear half of Eq. (7) can be substituted by Snell's law pursuant to Eq. (28). Eq. (8), (9) and (9') are also valid.

To obtain formulas corresponding to Eq. (20), (21) and (22), Eq. (28) is approximated by Eq. 29 pursuant to the condition where the arrival depth c is almost unity ($|y| \leq 0.2$).

Input lenticular:

$$x \approx -1 + \frac{1.8}{2} y^2 \quad (29)$$

Note: Eq. (1) can also be reduced into Eq. (29) in the region $|y| \leq 0.2$.

Then, Eq. (20), (21) and (22) and (23) are also valid, hence Eq. (24), (25) and (26) are also valid.

Hence, Table 1 excluding it's rows of $y_\nu$ and $\theta_\nu$ is also applicable to general cases of super parabola, which is shown in Table 2.

TABLE 2

| $x_\nu$ | 0 | −0.2 | −0.3 | −0.4 | −0.5 | −0.6 | −0.7 |
|---|---|---|---|---|---|---|---|
| k | 3.42 | 3.10 | 2.93 | 2.77 | 2.61 | 2.45 | 2.29 |
| 1/k | 0.292 | 0.323 | 0.341 | 0.361 | 0.383 | 0.408 | 0.437 |
| k/1.8 | 1.9 | 1.72 | 1.63 | 1.54 | 1.45 | 1.36 | 1.27 |

The values for k in Table 2 have been obtained assuming the following relationships:

Input lenticular profile for region $|y| \leq 0.2$ $$x \approx -1 + \frac{1.8}{2} y^2 \qquad (29)$$

Output lenticular profile $$-x = -\frac{1}{n} + \frac{k}{2} y^2 \qquad (19)$$

$$k = 1.8 + 1.62(1 + x_\nu) \qquad (25)$$

Figure 16:
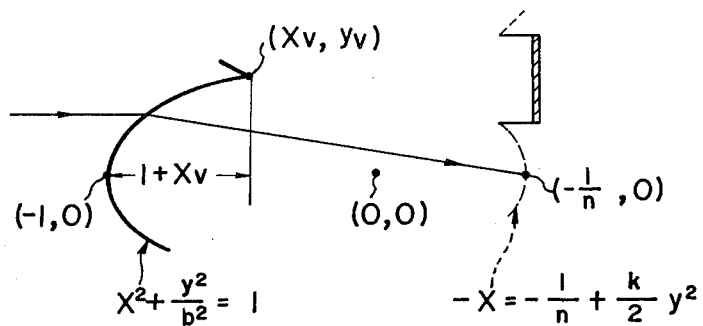
FIG. 16 is a horizontal sectional view showing coordinates for the apparatus of the present invention.

The coefficients of equations above have been associated with the coordinate shown in FIG. 16.

Figure 17:
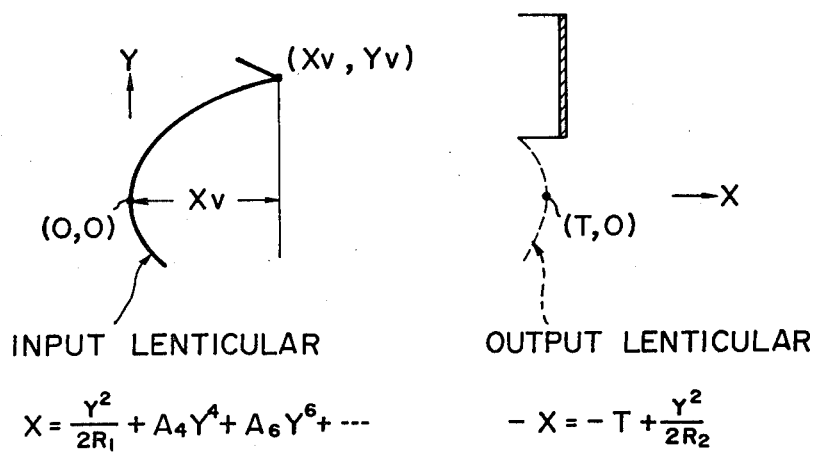
FIG. 17 is a horizontal sectional view showing other coordinates for the apparatus of the present invention.

To make it easy for this invention to be applied to general cases, another coordinate is shown in FIG. 17, where the origin is located at the top of input lenticular lens and (x, y) is replaced by (X, Y).

Input lenticular profile:

$$x = \frac{Y^2}{2R_1} + A_4 Y^4 + A_6 Y^6 + \ldots \qquad (30)$$

$R_1$: curvature radius
Output lenticular profile:

$$-x = -T + \frac{Y^2}{2R_2} \qquad (31)$$

T: thickness
$R_2$: curvature radius

T and $R_2$ can be expressed by $R_1$ as follows: (±% below represent the practically applicable nominal range.)

$$T = \frac{R_1}{1 - \frac{1}{n}} \quad (\pm 15\%) \qquad (32)$$

$$R_2 = \frac{R_1}{1 + (n-1)\frac{X_\nu}{R_1}} + \left(T - \frac{R_1}{1 - \frac{1}{n}}\right)\left(1 - \frac{1}{n}\right) \qquad (33)$$

(±20%)

The 2nd term in Eq. (33) disappears when Eq. (32) is met, which means the close-axis focal point of input lenticular lens is located on the output lenticular surface. The first term in Eq. (33) describes the proposed dependance of $R_1/R_2$ upon $X_\nu$ as shown in Table 3.

TABLE 3

| $X_\nu/R_1$ | 1.8 | 1.6 | 1.4 | 1.2 | 1.0 | 0.8 | 0.6 |
|---|---|---|---|---|---|---|---|
| $R_1/R_2$ | 1.9 | 1.8 | 1.7 | 1.6 | 1.5 | 1.4 | 1.3 |

As can be understood comparing Table 1 through 3, $R_1/R_2$ in Table 3 is equal to $k/1.8$ in Table 2 and $k/k_1$ in Table 1. Hence, in order to achieve one of the objects of this invention to assure audience coverage limit of more than ±35°, the ratio $R_1/R_2$ is required to be more than 1.3 (See Table 1).

In regard of die fabrication convenience, there may occur such cases as conic profiles other than a parabola are preferred for the output lenticular surface. In such cases Eq. (31) can be replaced by an alternative on the condition that it is substantially equivalent to Eq. (31) within the region $$|Y| \leq \frac{T_\epsilon}{n}.$$

Figure 1:
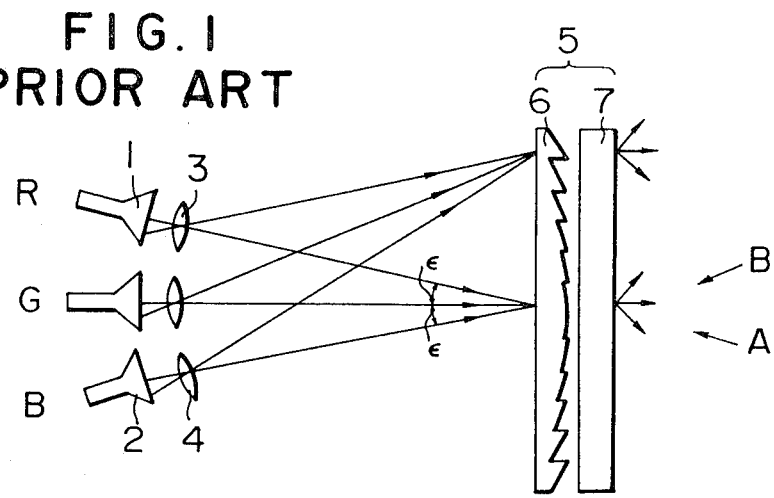
FIG. 1 is a schematic sectional view of a conventional projection TV.
Figure 2:
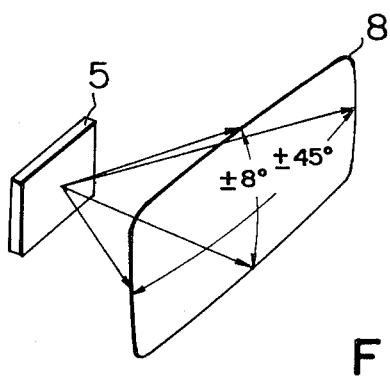
FIG. 2 is a schematic view showing desirable audience coverage.

Now that full disclosure has been made regarding the front element in FIG. 9, several variations will be disclosed regarding the vertically diffusing rear elements in FIG. 9 and Fresnel element in FIG. 1.

Figure 18:
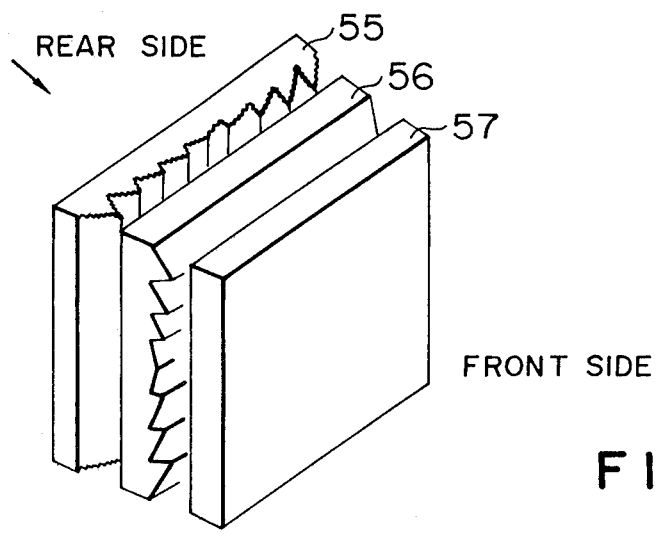
FIG. 18 is a simplyfied perspective view of screen according to the present invention.

FIG. 18 shows a simplified sketch of alternative Fresnel lenses to be used with the aforementioned front element. In FIG. 18, numeral 55 designates a horizontally converging Fresnel lens with a microscopic random diffusing surface on it. As an example, the period of the Fresnel lens is set at 0.27 mm. The diffusing angle of the random diffusing surface is set at approximately ±6-±12 degrees.

As an alternative, the random diffuser surface can be located on rear side of this sheet 55, or on the rear side of sheet 56. Sheet 56 is the vertically converging Fresnel lens. As an example the period is set at 0.5 mm, thickness at 3.0 mm. Sheet 57 is the front element as in FIG. 9 which has been already disclosed.

Figure 19:
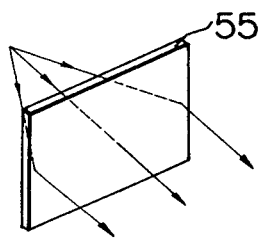
FIG. 19 is a perspective view showing light passage through a horizontal Fresnel element.

FIG. 19 shows the macroscopic converging effect by the sheet 55. Since sheet 57 can offer a wide audience angle by itself, the front conjugate of this Fresnel lens can be infinite, thus making the output beam normal to the screen. In case a finite front conjugate creating, for example, 2 degrees of refracting angle at the right and left sides of the screen is used, registration between the input lenticular and the output lenticular of the front element in FIG. 9 should carefully be so made to be pursuant to the light path at the right and left sides of the screen, thereby minimizing the light-blocking effect of the black stripes.

Figure 20:
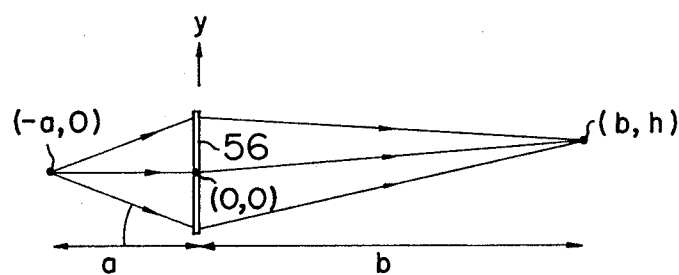
FIG. 20 is a vertical sectional view showing conjugates of a vertical Fresnel element according to the present invention.

FIG. 20 show the macroscopic converging effect of the vertically converging Fresnel lens 56. Since the microscopic diffusing angle is not to be enhanced by sheet 57, and since the audience is expected to be located in a limited narrow angle, it is highly desirable to incorporate a finite front conjugate. Moreover, since the audience feels comfortable when looking down on the screen by several degrees, it is better to locate the front conjugate in a upward direction. The conjugate point is designated by (b, h) and as an example b is 4 to 6 times screen height and h/b is 0.04 to 0.08. This approach improves the overall performance of the projection TV. More specifically, by adopting proper finite conjugate, the half gain angle of the diffuser-directivity can be chosen at a smaller value, which enhances the screen gain and brightness of the picture in regard of the light energy conservation law.

Figure 21:
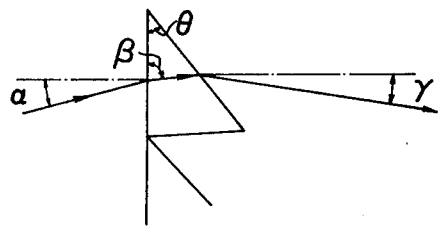
FIG. 21 is a simplified fragmentary sectional view of a Fresnel lens for analysis purpose.

FIG. 21 shows a section of a Fresnel lens and the angles $\alpha, \beta, \theta, \gamma$. From FIGS. 20 and 21, pursuant to Snell's law, the prism angle $\theta$ can be calculated as follows:

$$\sin \alpha = n \cos \beta$$
$$n \cos (180° - \theta - \beta) = \sin (\gamma + \theta)$$

$$\therefore \tan \theta = \frac{\sin \alpha + \sin \gamma}{n \sin \left\{ \cos^{-1} \left( \frac{\sin \alpha}{n} \right) \right\} - \cos \gamma},$$

where $\alpha = \tan^{-1} \frac{y}{a}$ $$\gamma = \tan^{-1} \frac{y - h}{b}$$

Thus $\theta$ can be obtained as a function of y with conjugate constants a, b and h. The above analysis can also be applied to other Fresnel lenses such as a circular Fresnel lens having only one finite front conjugate.

As has been disclosed, this invention can offer wider horizontal audience coverage with smaller color shifts, thus offering a superior picture quality.

Also, by incorporating proper conjugates for Fresnel lenses, wide vertical audience coverage and beautiful bright picture can also be achieved at the same time.

I claim:

1. A rear projection apparatus for displaying a color image comprising: red, green and blue color image sources located horizontally to each other in this order for producing respective color images of different colors;
    projection lenses located respectively in front of said image sources for projecting light fluxes from said respective image sources along converging optical paths; and
    a screen located at convergent points of said projected light fluxes and including a light-transmitting lenticular sheet having an input surface and an exit surface for the projected light fluxes;
    said input surface of the lenticular sheet being constituted by diffusing lenticular profiles having a ratio of lenticulated depth $X_v$ to close-axis-curvature radius $R_1$ ($X_v/R_1$) which is within a range of 0.5 to 1.8, said profiles being prolonged along the optical axis and constituting aspherical input lenticular lenses,
    said lenticular sheet having a thickness of approximately $$\left( 1 - \frac{1}{n} \right)$$

times said radius $R_1$ where n is refractive index of a material of said sheet,
    said aspherical input lenticular lenses refracting projected input light flux of the red color and the blue color having a path extending at an angle to the normal of said screen in such a way as to provide coma aberration at said exit surface of the lenticular sheet,
    said exit surface of the lenticular sheet having output lenticular lenses extending in the same direction as said input lenticular lenses and having light-stopping black stripes incorporated thereon and extending in parallel with said input lenticular lenses,
    said output lenticular lenses refracting light flux of the red color and the blue color in accordance with said coma aberration formed thereon, whereby a center light flux of input light at an angle to the normal of said screen projected at center portions of said input lenticular lenses is refracted by a larger amount in view of the difference between the red color and the blue color than the amount of refraction of other light flux projected close to valley portions of said input lenticular lenses, thereby making an output light flux corresponding to said input center light flux not parallel to each other but shifted in opposite directions by an amount substantially proportional to said depth $X_v$ of said input lenticular profiles,
    said black stripes being located at an area where substantially no efficient light flux exits.

2. A rear projection apparatus according to claim 1; wherein said aspherical input lenticular profiles are ellipsoids having an eccentricity substantially equal to $1/n$.

3. A rear projection apparatus according to claim 1; wherein said output lenticular lenses have a profile in the form of a conic curve having a close-axis curvature radius $R_2$ which is smaller than $R_1$.

4. A rear projection apparatus according to claim 3; wherein $R_1/R_2$ is substantially equal to $\{1+(n-1)X_v/R_1\}$.

5. A rear projection apparatus according to claim 3, wherein said refraction angle is larger than 2 degrees.

6. A rear projection apparatus according to claim 1; wherein Fresnel lenses are disposed adjacent to said input lenticular lenses of said screen.

7. A rear projection apparatus according to claim 6; wherein said Fresnel lenses are constituted by a first sheet adjacent said input surface of said lenticular sheet and provided with vertically converging Fresnel lenses, and a second sheet adjacent said first sheet and provided with horizontally converging Fresnel lenses.

8. A rear projection apparatus according to claim 6; wherein a random surface diffuser is incorporated on at least one of the surfaces of said screen.

9. A rear projection apparatus for displaying a color image comprising:
    first, second and third color image sources disposed horizontally with respect to each other for producing respective color images of different colors;
    projection lenses located respectively in front of said image sources for projecting light fluxes from said respective image sources; and
    a screen for receiving the projected light fluxes, said screen being located at convergent points of said projected light fluxes and including a light-transmitting lenticular sheet having an input surface and an exit surface for the projected light fluxes;
    said input surface of said lenticular sheet being consituted by horizontally diffusing lenticular profiles having a ratio of lenticulated depth $X_v$ to close-axis-curvature radius $R_1$ ($X_v/R_1$) which is within a range of 0.5 to 1.8, said profiles being prolonged along the optical axis and constituting aspherical input lenticular lenses,
    said lenticular sheet having a thickness of approximately $$\left( 1 - \frac{1}{n} \right)$$

times the radius $R_1$ where n is a refractive index of a material of said sheet, said aspherical input lenticular lenses refracting projected input light fluxes of said first and third colors having a path extending at an angle to the normal of said screen so as to provide coma aberration at said exit surface of said lenticular sheet, said aspherical input lenticular profiles being ellipsoids having an eccentricity substantially equal to $1/n$, said exit surface of said lenticular sheet having output lenticular lenses extending in the same direction as said input lenticular lenses and having light-stopping black stripes incorporated thereon and extending in parallel with said input lenticular lenses, said output lenticular lenses reflecting light fluxes of said first and third colors in accordance with said coma aberration formed thereon, whereby a center light flux of input light at an angle to the normal of said screen projected at center portions of said input lenticular lenses is refracted by a larger amount in view of the difference between said first and third colors than the amount of refraction of other light flux projected close to valley portions of said input lenticular lenses, said black stripes being located at an area where substantially no efficient light flux exits.

10. A rear projection apparatus according to claim 9, wherein said screen further comprises a Fresnel element adjacent said input surface of said lenticular sheet for receiving the projected light fluxes.

11. A rear projection apparatus according to claim 10, wherein said output lenticular lenses have a profile in the form of a conic curve having a close-axis curvature radius $R_2$ which is smaller than $R_1$, a ratio of $R_1/R_2$ being substantially equal to $[1+(n-1)X_v/R_1]$.

12. A rear projection apparatus according to claim 10, wherein said Fresnel element has a finite front conjugate, light fluxes of said second color exiting from right and left sides of said Fresnel element having a macroscopically converging refraction angle, and a pitch of said output lenticular lenses being smaller than the pitch of said input lenticular lenses, whereby a direction from a center of said profile of said input lenticular lenses to a center of said profile of said output lenticular lenses is substantially parallel to a direction of the exiting light fluxes of said second color at the sides.

13. A rear projection apparatus according to claim 9, wherein said Fresnel element comprises a first sheet adjacent said input surface of said lenticular sheet and provided with vertically converging Fresnel lenses, and a second sheet adjacent said first sheet and provided with horizontally converging Fresnel lenses.

* * * * *